US007080907B2

(12) United States Patent
Andrews et al.

(10) Patent No.: US 7,080,907 B2
(45) Date of Patent: *Jul. 25, 2006

(54) SYSTEM AND METHOD FOR ALIGNING REFERENCE MARKS ON A LENS BLANK USING ADJUSTABLE ALIGNMENT MARKS

(75) Inventors: Daniel E Andrews, Charlottesville, VA (US); Jennifer Snyder Shanks, Charlottesville, VA (US)

(73) Assignee: National Optronics, Inc., Charlottesville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/009,025

(22) Filed: Dec. 13, 2004

(65) Prior Publication Data

US 2005/0151927 A1    Jul. 14, 2005

Related U.S. Application Data

(63) Continuation of application No. 10/238,894, filed on Sep. 11, 2002, now Pat. No. 6,846,078.

(51) Int. Cl.
G02C 7/02    (2006.01)
(52) U.S. Cl. ..................................... 351/177
(58) Field of Classification Search ............... 351/159, 351/177
See application file for complete search history.

(56) References Cited

U.S. PATENT DOCUMENTS 4,206,549 A    6/1980  Gould
4,372,368 A    2/1983  Lombard
4,977,675 A   12/1990  Jewett, Sr.
5,283,980 A    2/1994  Lohrenz
5,505,654 A    4/1996  Wood
5,720,647 A    2/1998  Gottschald
5,721,644 A    2/1998  Murray
5,919,080 A    7/1999  Savoie
5,960,550 A   10/1999  Weir
6,011,630 A    1/2000  Shanbaum
6,012,965 A *  1/2000  Savoie ........................ 451/6
6,045,432 A    4/2000  Shibata
6,056,633 A    5/2000  Sesena
6,095,896 A    8/2000  Kobayashi
6,099,383 A    8/2000  Mizuno
6,220,929 B1   4/2001  Mizuno
6,234,869 B1   5/2001  Kobayashi
6,250,989 B1   6/2001  Mizuno
6,283,826 B1   9/2001  Mizuno
6,328,628 B1  12/2001  Mizuno
6,328,635 B1  12/2001  Suzuki

* cited by examiner

Primary Examiner—Scott J. Sugarman
(74) Attorney, Agent, or Firm—Berenato, White & Stavish, LLC

(57) ABSTRACT

The disclosed invention relates to a system and method for aligning reference marks defining the optical center or major reference point on a lens blank with a series of alignment marks, or "fiducials". The fiducials comprise first and second alignment bars displayed on a display operably associated with a computer, and overlay the reference marks, also displayed on the display. The fiducials may be adjusted to accurately precisely align the lens blank.

19 Claims, 10 Drawing Sheets

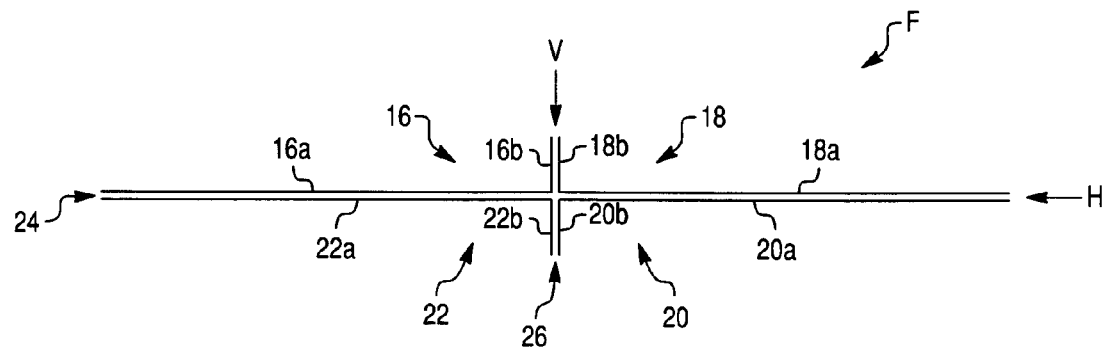
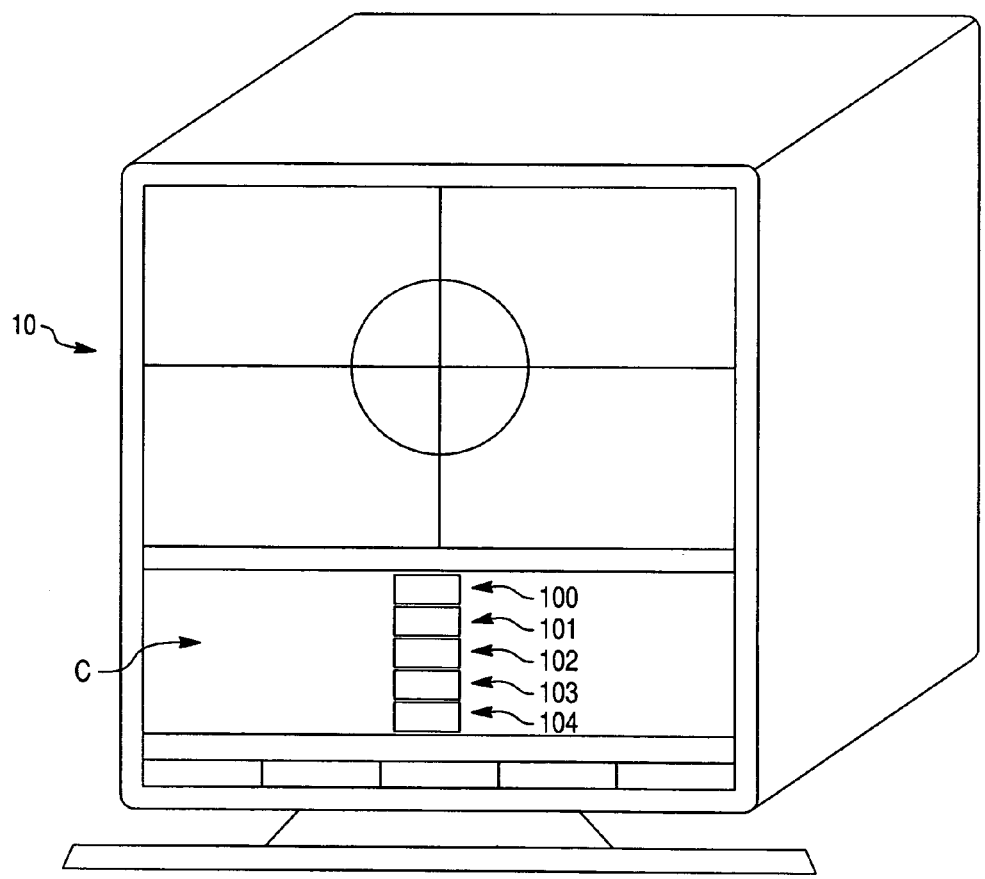

SYSTEM AND METHOD FOR ALIGNING REFERENCE MARKS ON A LENS BLANK USING ADJUSTABLE ALIGNMENT MARKS

CROSS REFERENCE TO RELATED APPLICATIONS

This application is a continuation of application Ser. No. 10/238,894, filed Sep. 11, 2002, now U.S. Pat. No. 6,846,078 and to which priority is claimed under 35 U.S.C. ≥120, and which is related to application Ser. No. 10,238,898, filed Sep. 11, 2002, of Mark Donald Wagner et al., entitled Lens Blank Alignment and Blocking Device and Method, the disclosure of which is incorporated herein by reference.

FIELD OF THE INVENTION

The disclosed invention relates to a system and method for positioning a lens blank for application of a lens block by aligning reference marks on the blank with alignment marks displayed on a display. Specifically, the reference marks on the blank may be viewed on a display when the blank is positioned on a retaining apparatus. A computer is operably associated with the display and the retaining apparatus. Alignment marks are displayed on the display, and may be adjusted using a user interface, such as a keyboard. The reference marks on the blank may be precisely aligned with the adjustable alignment marks, thereby aligning the blank for application of the block in order to permit proper edging of the blank to the finished lens shape.

BACKGROUND OF THE INVENTION

Prescription eyeglass lenses are curved in such a way that light is correctly focused onto the retina of a patient's eye, improving vision. Such lenses are formed from glass or plastic lens "blanks" having certain desired properties to provide the correct prescription for the patient. The lens blanks are usually circular and of substantially larger dimension, for example four inches in diameter and one and a half inches thick, compared to the relatively smaller finished lenses assembled into eyeglass frames. Therefore, a lens blank must be edged to fit an eyeglass frame selected by the patient.

Ophthalmic laboratory technicians cut, grind, edge, and finish lenses according to prescriptions provided by dispensing opticians, optometrists, or ophthalmologists. The specifications include the patient's full prescription, including: 1) the total power the finished lens must have; 2) the strength and size of any segments, if needed (i.e. multifocal lenses); 3) the power and orientation of any cylinder curves; and 4) the location of the optical center and any inducted prism that may be needed. The optical center is the spot on the eyeglass lens where light passes through without refracting, and is normally placed in front of the patient's pupil.

The technician selects a lens blank based on the prescribed power. The selected blank may also include prescribed segments. In order to match the prescription exactly, one ore more curves may be generated or otherwise formed on the back of the blank. Once the curves are formed, a series of dots are drawn on the front surface of the lens to define a 180-degree reference line. If a segment lens is prescribed, the segment edge is parallel to the 180-degree line.

With segment lenses, the distance optical center of the lens is usually slightly above the upper segment edge, and dots are marked at the appropriate distance. The lens may then be aligned and fit onto the edger to edge the required shape onto the lens blank.

At this point, the lens blank has had additional curves formed in the back of the lens, and it has been polished. However, the large diameter blank still has to be sized and shaped to fit into the frame selected by the patient. The lens blank is shaped on a linear lathe, or edger, using a grinding wheel or a router. The lens must again be prepared to accept a block. A lens block is placed where the geometrical center (i.e. the geographic center of the lens that is edged for a frame) of the finished lens will be, and the lens is again oriented on the 180-degree axis. Alternately, the lens block may be placed on the optical center or other major reference point of the lens blank. The lens is then edged to fit the frame, and prepared and assembled with the corresponding frame parts into a finished pair of glasses.

The process of grinding and edging eyeglass lenses from lens blanks requires great care and precision. It is particularly important that precision and accuracy be used when orienting the blank before edging, as described above, so that the proper curvature, optical center and shape are achieved. If the blank is misaligned, the lens will not have the prescribed specifications. Technician time, as well as materials, will be wasted if the blank is misaligned and improperly ground and edged.

Therefore, in order to properly align the lens blank, reference marks are provided on the blank. Blanks are formed with an optical center through which the visual axis of the eye should pass. As noted above, the optical center is usually positioned in front of the pupil. The visual axis is an imaginary line of sight which exits the eyeball through the center of the pupil. Generally, reference marks on each blank define the optical center or major reference point and the 180-degree axis line. In this way, the reference marks define the point through which the visual axis should pass when the line-of-sight of the patient is in the normal primary straight-ahead position. Therefore, it is important that the reference marks on the blank are properly aligned so that an accurate optical center is achieved when the blank is edged. The reference marks on the blank should be on the visual axis when the line-of-sight is in the normal primary straight-ahead position.

In the case of a single vision or monofocal lens, the intersection with the visual axis is usually at the optical center of the lens, which is generally coincident with the geometrical center. A segment or multifocal lens has a defined area(s) with a different prescription. A visible demarcation line separates the different prescriptions. Blanks are formed with these specialized segments, and the upper edge of the segment defined by the demarcation line may be used as a reference to orient the point of intersection of the lens by the visual axis. Likewise, an executive segment lens has a demarcation line which may also be used as a reference for orientation of the point of intersection. The demarcation line on an executive segment lens, however, extends across the entire finished eyeglass lens, as compared to the defined area on the segment lens.

A progressive lens provides additional prescriptive power via a gradual increase in power, which is facilitated by a transition zone. However, progressive lenses do not have demarcation lines, as in segment or executive segment lenses. In a progressive lens, the visual axis for both eyes is oriented at the optical center where the progressive power begins to change on the lens.

Progressive lens blanks usually have two sets of reference marks, a temporary set and a permanent set. The temporary reference marks usually consist of a fitting cross, which falls 2 to 3 mm from the center of the pupil, and a distance reference center mark and a near reference center mark to use in checking the powers of the distance and near prescription areas. The permanent reference marks establish the horizontal line at the optical center of the blank.

Lens blanks generally have reference marks identifying the optical center or other major reference point and the 180-degree axis line on one surface, though these reference marks may differ depending on the lens type. The optical center and 180-degree reference line of the lens are aligned with the center point and 180-degree line of the block, respectively. Edging the blank to a desired peripheral outline involves locating and aligning the optical center and 180-degree reference line with the center point and 180-degree reference line of the block. The periphery of the lens is then edged to a desired shape.

The orientation and positioning of reference marks on a lens blank to the lens block is known in the art. However, there is a degree of inaccuracy in prior art methods because, generally, the reference marks on the blank are visually aligned by the technician with the center point and 180-degree line of the block when securing the lens to the block. Among the drawbacks associated with this general method of alignment is the necessity for the alignments to be made by a skilled technician. Thus, increased labor costs may be incurred. Furthermore, the operation of the blocking equipment by various technicians may affect quality and consistency if various technicians operate the machinery.

Even if a technician is properly trained and skilled, it is often difficult to align the reference marks on the blank with the corresponding block because references marks are not uniform. The size, length and/or width of reference marks vary from blank to blank and laboratory to laboratory. Furthermore, marking device inconsistencies may also result in abnormal or uneven reference marks. Reference marks may also vary depending on the individual actually marking the blank (i.e. the manufacturer or dispensing optician). Thus, methods to align the blank do not provide the accuracy required for precision alignment.

Therefore, there is a need for an alignment system that increases the accuracy and precision of any technician when aligning the blank to the block, or aligning the blank for grinding or edging, regardless of the technician's skill, and regardless of the uniformity of the reference marks on the blank.

SUMMARY OF THE INVENTION

A system for aligning reference marks on a lens blank comprises first and second fiducials displayed on a display operably associated with a computer. The first fiducials have a first adjustable spacing for aligning reference marks on a lens blank. The second fiducials displayed on the display have a second adjustable spacing for aligning reference marks on the lens blank.

The disclosed invention also provides a method for aligning reference marks on a lens blank, comprising the steps of: providing a lens blank having reference marks thereon; displaying the reference marks on a display operably associated with a computer; selecting with a user interface fiducials corresponding to the lens blank, whereby the fiducials have first and second spacings for aligning the reference marks; displaying the selected fiducials on the display; adjusting with the user interface the first and second spacings of the selected fiducials; displaying the adjusted fiducials overlaying the reference marks on the display; and orienting the lens blank so that the reference marks are aligned with the adjusted fiducials thereby orienting and positioning the lens blank.

DESCRIPTION OF THE DRAWINGS

FIG. 2 is a front view of fiducials for aligning a single vision lens blank in a first orientation according to a first embodiment of the invention;

FIG. 3 is a perspective view of a calibration screen displayed on a display;

DETAILED DESCRIPTION OF THE INVENTION

The present invention relates to a system and method for aligning a lens blank to a retaining apparatus, such as a lens block, by aligning reference marks on the blank with adjustable alignment marks, or "fiducials", whereby both the reference marks and the fiducials are displayed on a display operably associated with a computer. Accurate alignment of the lens blank ensures that the blank is properly edged during the manufacturing process.

As noted above, reference marks may vary depending on the type of lens prescribed (i.e. single vision, segment, executive segment or progressive). However, most lens blanks usually have reference marks identifying the optical center and the cylinder axis on one surface. For segment and executive segment lenses, the line of demarcation is usually aligned instead of the cylinder axis. The disclosed invention provides a system and method for aligning the reference marks with fiducials.

Figure 1:
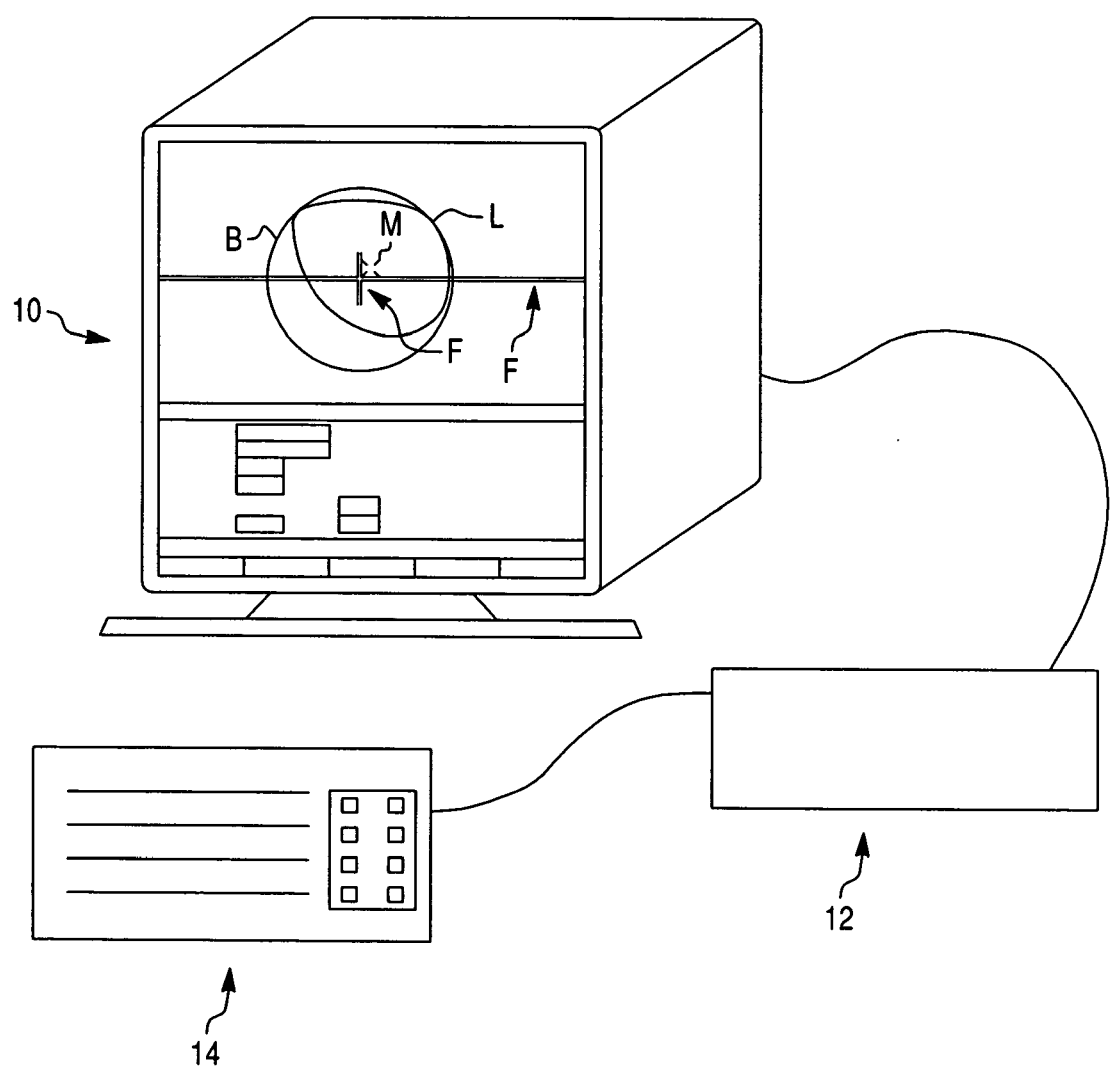
FIG. 1 is a schematic diagram of a display operably associated with a computer and user interface according to the present invention.

In a first embodiment of the present invention, fiducials are provided for aligning reference marks defining the optical center and cylinder axis on a single vision lens. After the lens blank is positioned on a retaining apparatus, an image of the lens blank B is displayed on a display 10, as well as an image of the desired shape of the edged and finished lens L, as best shown in FIG. 1. Preferably, a computer 12 is operably associated with display 10, as well as a user interface 14. User interface 14 is preferably a keyboard, but may be any other input device known in the art. Adjustable fiducials F and lens blank reference marks M are also displayed on display 10. Reference marks M are projected onto display 10 and are applied to blank B.

As best shown in FIG. 2, fiducials F comprise four L-shaped members 16, 18, 20 and 22. Each of L-shaped members 16, 18, 20 and 22 comprise a first leg 16a, 18a, 20a and 22a, respectively, which is perpendicular to a second leg 16b, 18b, 20b and 22b, respectively. L-shaped members 16, 18, 20 and 22 are positioned to form horizontal bar H and vertical bar V, whereby first legs 16a and 18a are parallel to first legs 20a and 22a. Likewise, second legs 16b and 22b are parallel to second legs 18b and 20b. Horizontal bar H is perpendicular to vertical bar V, and preferably intersects vertical bar V at its midpoint, as shown in FIGS. 1–2, 4–6, 8–10, and 12–17. However, it should be understood that the terms horizontal and vertical, as used herein, are with reference to the FIGS. 1–2, 4–6, 8–10, and 12–17, and those skilled in the art will recognize that bars H and V may have any desired orientation relative to a display upon which they are displayed.

As best shown in FIG. 2, first legs 16a and 18a are separated from first legs 20a and 22a by a spacing 24, thereby defining the width of horizontal bar H. Similarly, second legs 16b and 22b are separated from second legs 18b and 20b by a spacing 26, thereby defining the width of vertical bar V. Spacing 24 may be adjusted so that the distance between first legs 16a and 18a and first legs 20a and 22a may be increased or decreased. Likewise, spacing 26 may be adjusted so that the distance between second legs 16b and 22b and second legs 18b and 20b may be increased or decreased. In this way, the width of bars H and V may be adjusted to encompass and overlay reference marks from lens blank B displayed on display 10.

Spacings 24 and 26 may be adjusted by entering data through user interface 14, which is operably associated with computer 12, as known in the art. Those skilled in the art will understand that computer 12 may be integral with and incorporated into a blocker, as disclosed in the above referenced patent application. As best shown in FIG. 3, a calibration screen C is provided on display 10. Calibration screen C includes various input fields 100, 101, 102, 103 and 104 for controlling the positioning of fiducials F on display 10, as well as adjusting spacings 24 and 26. After prompting by calibration screen C, the user may enter positioning and spacing values into fields 100, 101, 102, 103 and 104. Note that fields 100–104 are illustrated in FIG. 3 for purposes of explanation only. It is understood that calibration screen C may include additional fields, or have varying configurations depending on the operating system and/or user preference.

The user may enter values for positioning and spacing adjustments into fields 100–104 with user interface 14. Specifically, horizontal bar H may be moved up or down (relative to display 10) by entering the desired horizontal center in field 100. Likewise, vertical bar V may be moved left or right by entering the desired vertical center in field 101. Spacings 24 and 26 may be adjusted by entering the desired values in fields 102 and 103. Axis separation, to be discussed below, may be adjusted by entering a desired value in field 104. The adjustments entered by the user are thereafter displayed on display 10, above calibration screen C, as shown in FIG. 3.

Spacings 24 and 26 are independently adjusted by entering the desired values in separate fields. Note that any convenient measure of distance may be used in the fields for controlling the width of bars H and V, such as pixels or millimeters. In a preferred embodiment, the user may enter either a specific numerical value into the corresponding field for the desired adjustment of spacings 24 and/or 26, or specify the desired direction for the change in spacings 24 and 26 (i.e. increase or decrease widths of bars H and/or V). For example, an "up" arrow on user interface 14 would increase spacing 26 of vertical bar V by a predetermined amount when actuated by the user. Likewise spacing 24 of horizontal bar V may be increased or decreased a predetermined amount using "up" or "down" arrows when the corresponding field for adjustment of horizontal bar H is highlighted. The computer 12 contains software to generate the L-shaped members 16, 18, 20, 22 and the spacings 24 and 26.

Figure 4:
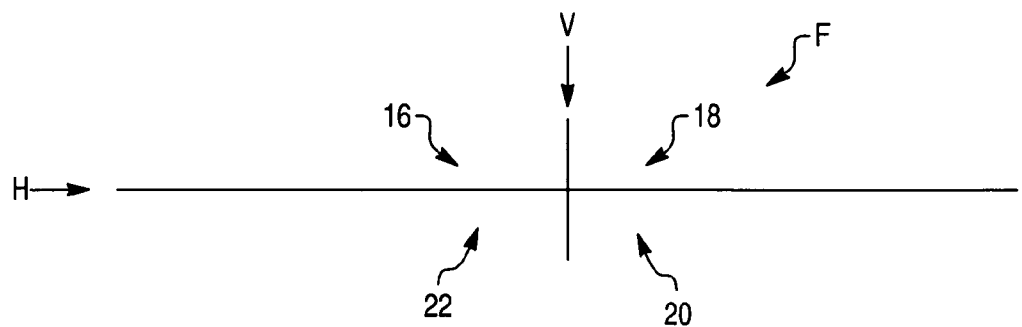
FIG. 4 is a front view of the fiducials of FIG. 2 in a second orientation.
Figure 5:
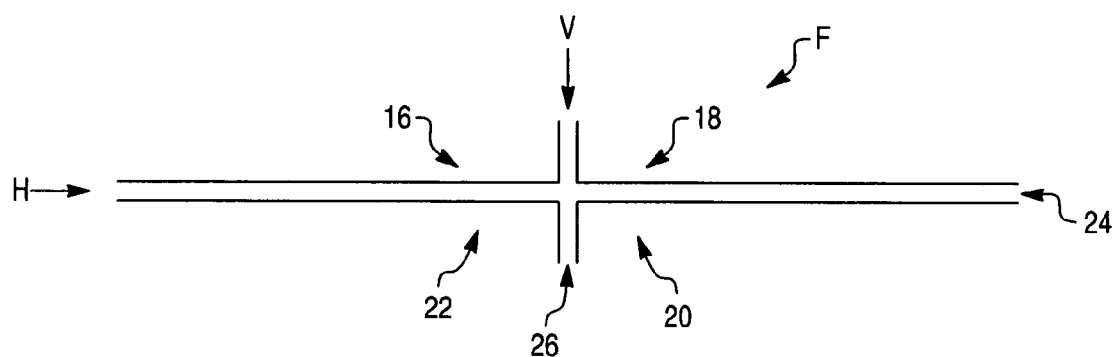
FIG. 5 is a front view of the fiducials of FIG. 2 in a third orientation.
Figure 6:
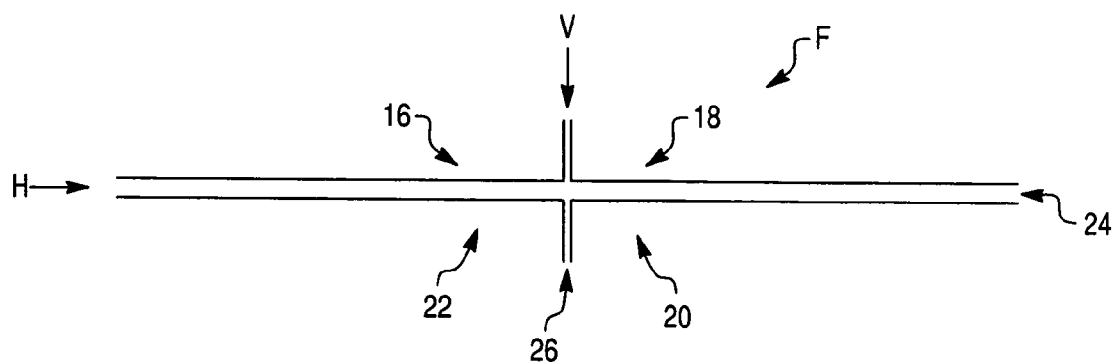
FIG. 6 is a front view of the fiducials of FIG. 2 in a fourth orientation.

Therefore, the user may adjust spacings 24 and 26 as needed to properly align the reference marks on the lens blank B displayed on display 10. As best shown in FIG. 4, spacings 24 and 26 may be adjusted to zero, so that there is no space separating L-shaped members 16, 18, 20 and 22. For example, a value of 0 pixels may be entered into fields controlling spacings 24 and 26 on calibration screen C. Spacings 24 and 26 may also be increased to encompass wider reference marks on lens blank B, as best shown in FIG. 5. For example, a value of 5 pixels may be entered into fields controlling spacings 24 and 26. As noted above, spacings 24 and 26 may be independently adjusted. For example, spacing 24 may be increased and spacing 26 may be decreased, as best shown in FIG. 6. Therefore, spacings 24 and 26 are adjustable and customizable depending on the particular reference marks on lens blank B, and the preferences of the user. The adjustable fiducials F of the present invention provide the technician with the ability to more accurately align the reference marks, thereby properly edging the lens blank B to achieve the prescribed specifications.

Figure 7:
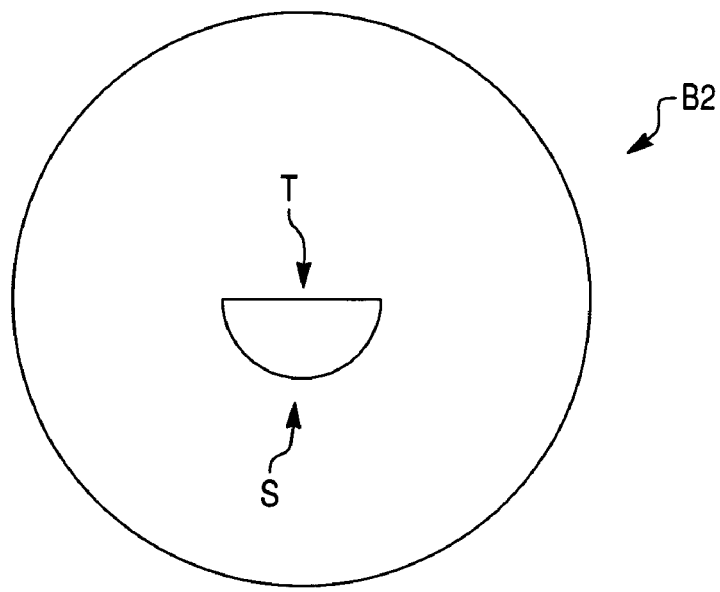
FIG. 7 is a front view of a segment lens blank.

In a second embodiment, fiducials F2 are provided for aligning reference marks on segment lenses. As best shown in FIG. 7, segment or multifocal lens blanks B2 include a particular segment S having a different prescription than the blank B2. Generally, a segment lens, for example a bifocal, includes a smaller portion of the lens that is used for near vision, and a surrounding larger portion of the lens that is used for distance vision. Segment S may be preformed during manufacture of the lens blank B2 having a predetermined size and width. As such, fiducials F2 are provided to align reference marks on such a lens blank B2.

Figure 8:
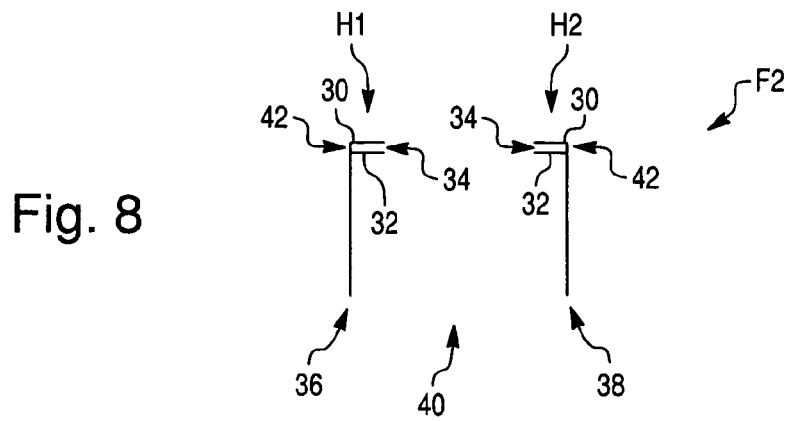
FIG. 8 is a front view of fiducials for aligning a segment lens blank in a first orientation according to a second embodiment of the invention.
Figure 9:
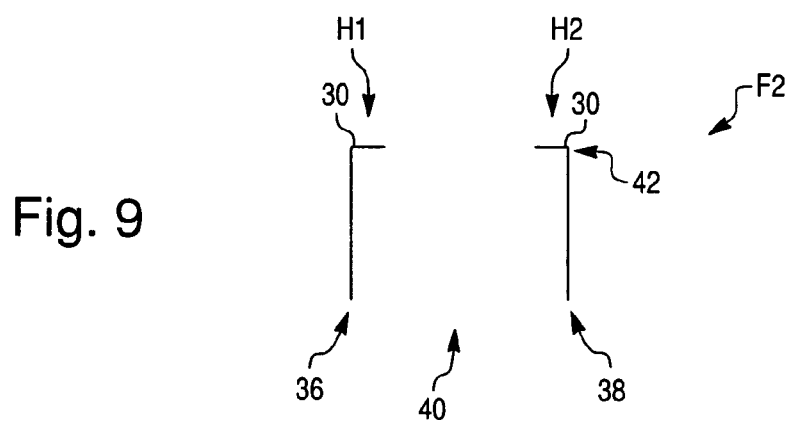
FIG. 9 is a front view of the fiducials of FIG. 8 in a second orientation.
Figure 10:
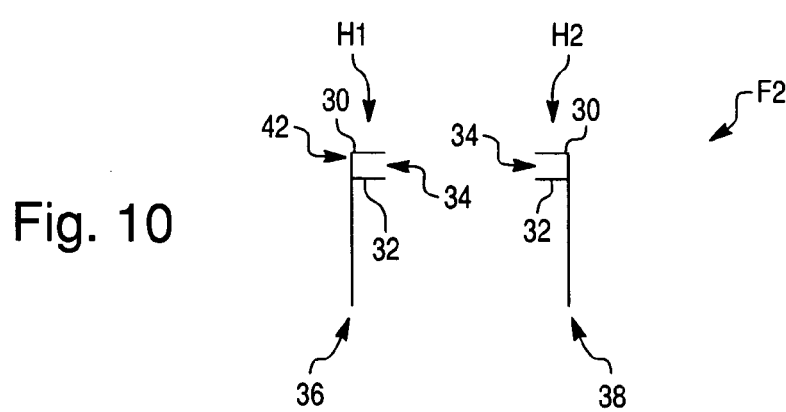
FIG. 10 is a front view of the fiducials of FIG. 8 in a third orientation.

As best shown in FIG. 8, fiducials F2 according to the second embodiment comprise a pair of horizontal bars H1 and H2. Each of the horizontal bars H1 and H2 include a first horizontal line 30, which is parallel to a second horizontal line 32. First and second horizontal lines 30 and 32 define spacings 34 therebetween, as shown in FIGS. 8–10. Fiducials F2 further comprise a first vertical line 36, which is parallel to a second vertical line 38, defining a spacing 40 therebetween.

Horizontal bar H1 is perpendicular to vertical line 36, and horizontal bar H2 is perpendicular to vertical line 38. In addition, horizontal bars H1 and H2 extend inwardly from first and second vertical lines 36 and 38, extending into spacing 40 as shown in FIG. 8. Preferably first horizontal lines 30 extend from end points 42 of first and second vertical lines 36 and 38. Horizontal bar H1 and first vertical line 36 are a mirror image of horizontal bar H2 and second vertical line 38.

The technician may align segment S between first and second vertical lines 36 and 38, so that segment S precisely fits within spacing 40 on display 10. The top T of segment S, as shown in FIG. 7, may be aligned with first horizontal lines 30, and second horizontal lines 32. As in the first embodiment, the user may adjust spacing 34 by entering the desired value in the calibration screen C with user interface 14, as explained in the first embodiment. Spacing 40 may also be adjusted by entering a desired value with user interface 14. However, adjustment to spacing 40 is made on a main screen having a segment width field for entering the desired width. Therefore, accurate and precise alignment of segment S and/or additional reference marks on lens blank B2 may be achieved.

As best shown in FIG. 9, spacings 34 may be decreased to zero, so that second horizontal lines 32 merge into first vertical lines 30. Spacing 40 is adjusted, given the size of segment S is variable depending on the prescription and lens shape. As best shown in FIG. 10, spacings 34 have been increased. Note that even if spacing 34 is adjusted, horizontal bar H1 and first vertical line 36 remain symmetrical with horizontal bar H2 and second vertical line 38. Furthermore, spacing 34 is preferably adjusted by moving the positioning of second horizontal lines 32, so that first vertical lines always extend from end points 42, as best shown in FIGS. 8–10.

Figure 11:
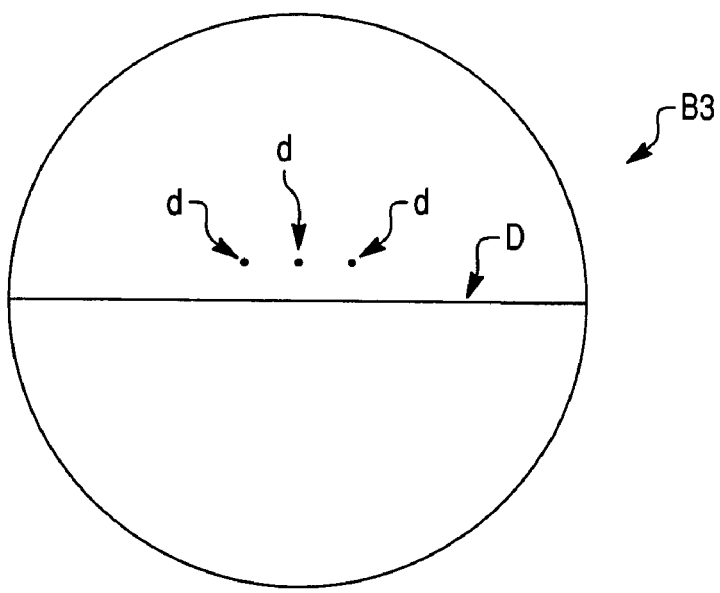
FIG. 11 is a front view of an executive segment lens blank.

In a third embodiment, fiducials F3 are provided for aligning reference marks on executive segment lenses. As best shown in FIG. 11, executive segment lens blanks B3 also include multiple prescriptions. However, a demarcation line D between two or more prescriptions extends across the entire lens blank. Therefore, there is not a segment having a pre-selected width, as in segment lenses. In addition to demarcation line D, three lensometer dots d are provided on lens blank B3 for alignment of the blank.

Figure 12:
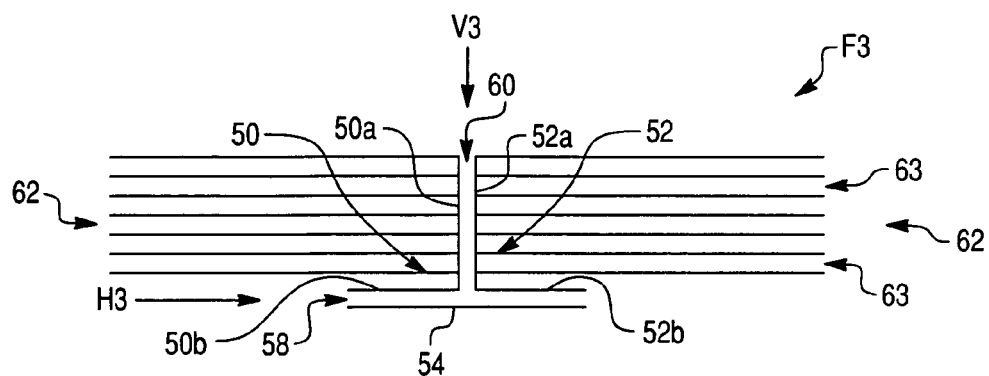
FIG. 12 is a front view of fiducials for aligning an executive segment lens blank in a first orientation according to a third embodiment of the invention.

As best shown in FIG. 12, fiducials F3 comprise two L-shaped members 50 and 52. Each of L-shaped members 50 and 52 comprise a first leg 50a and 52a, and a second leg 50b and 52b. First legs 50a and 52a are parallel and form vertical bar V3. A horizontal line 54 is parallel to second legs 50b and 52b, and forms horizontal bar H3. Vertical bar V3 is perpendicular to horizontal bar H3, and preferably meets horizontal bar at its midpoint. Horizontal bar H3 has a width defined by a spacing 58, and vertical bar V3 has a width defined by spacing 60. As in the first embodiment, spacings 58 and 60 may be independently adjusted by entering a desired value on the calibration screen C using user interface 14. Therefore, the adjustment of horizontal and vertical bars H3 and V3 is identical to that described in the first embodiment for horizontal and vertical bars H and V, and same will not be repeated hereafter.

However, fiducials F3 further comprise a plurality of parallel lines 62, which are all parallel to horizontal bar H3, and extending from first legs 50a and 52a away from spacing 60. Lines 62 are positioned above horizontal bar H3, and are longer than horizontal bar H3, as best shown in FIGS. 12–16. Each of parallel lines 62 is separated by adjustable axis spacings 63, so that each one of the plurality of parallel lines 62 are spaced apart the same distance. The technician may align the demarcation line of the executive segment lens blank B3 of FIG. 11 with spacing 54 of H3. The technician may also align the lensometer dots d on the lens blank B3 with one of parallel lines 62. The center dot d may be aligned with spacing 60 of V3. If needed, spacings 63 may be adjusted by entering the desired value in the corresponding field 104 of calibration screen C, as shown in FIG. 3.

Figure 13:
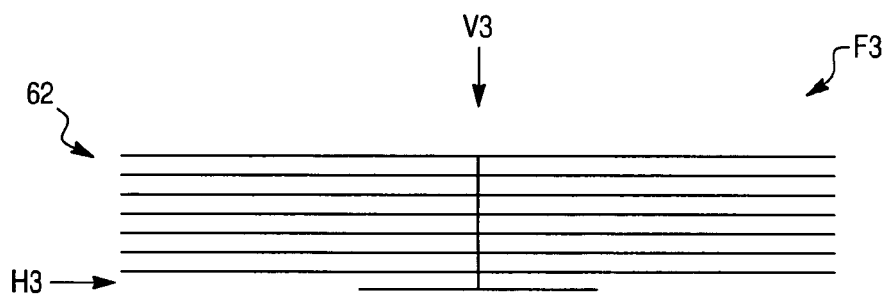
FIG. 13 is a front view of the fiducials of FIG. 12 in a second orientation.
Figure 14:
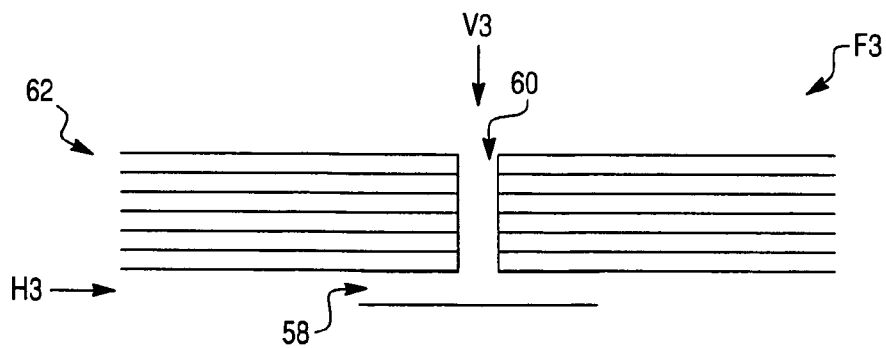
FIG. 14 is a front view of the fiducials of FIG. 12 in a third orientation.
Figure 15:
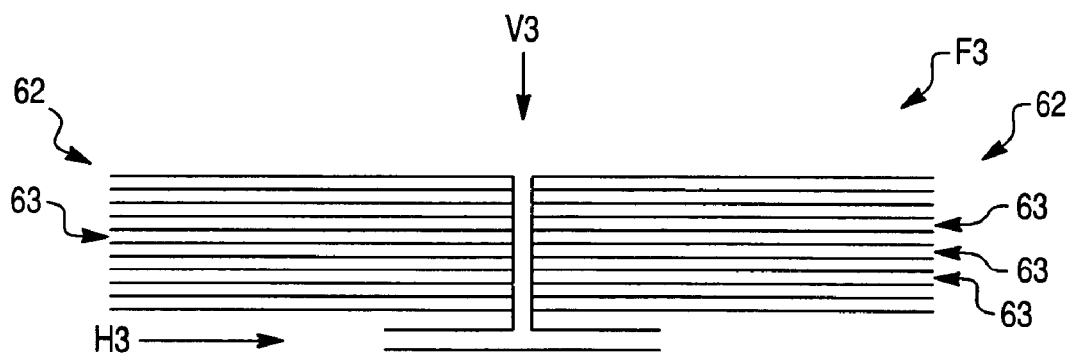
FIG. 15 is a front view of the fiducials of FIG. 12 in a fourth orientation.
Figure 16:
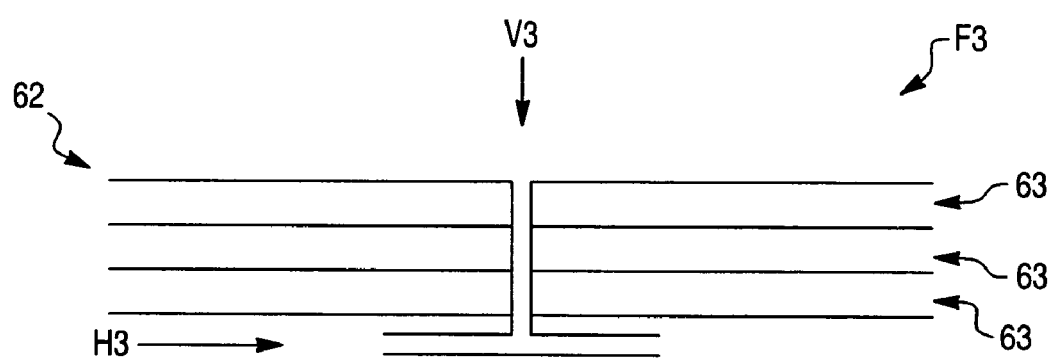
FIG. 16 is a front view of the fiducials of FIG. 12 in a fifth orientation.

As best shown in FIG. 13, spacings 58 and 60 may be decreased to zero, thereby defining horizontal bar H3 and vertical bar V3. Likewise, spacings 58 and 60 may be increased, as best shown in FIG. 14. The user actuates adjustment of spacings 58 and 60 as described above. As best shown in FIG. 15, spacings 63 have been decreased. Spacings 63 may also be increased, as best shown in FIG. 16. Note that a variable number of plurality of parallel lines 62 are shown in FIGS. 12, 15 and 16. Preferably, fewer parallel lines 62 are displayed if spacings 63 are increased (FIG. 16), and more parallel lines 62 are displayed if spacings 63 are decreased (FIG. 15). It is understood, however, that any number of parallel lines may be displayed on display 10, depending on user preference.

In a fourth embodiment, fiducials F4 are provided for aligning reference marks on a progressive lens blank. Progressive lenses provide a range of prescription strengths wherein additional power is generated via a gradual increase in power, which is facilitated by a transition zone. Thus, the demarcation line is eliminated.

Figure 17:
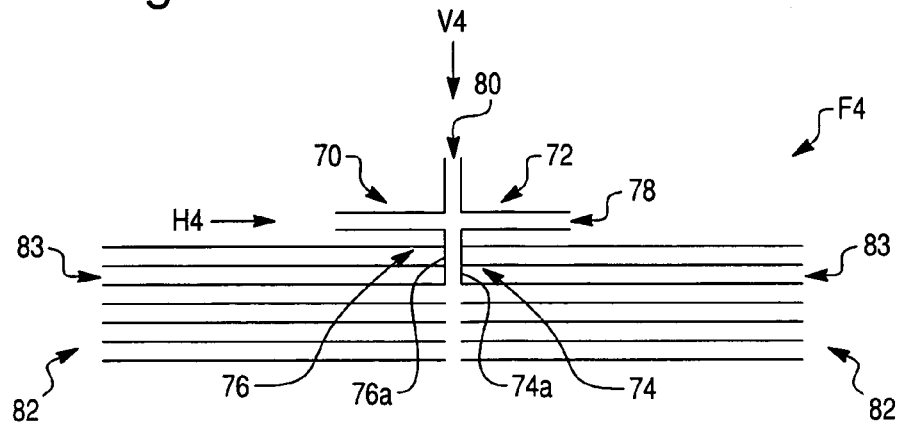
FIG. 17 is a front view of fiducials for aligning a progressive lens blank in a first orientation according to a fourth embodiment of the invention.

As best shown in FIG. 17, fiducials F4 comprise four L-shaped members 70, 72, 74 and 76, forming horizontal bar H4 and vertical bar V4. Although horizontal and vertical bars H4 and V4 have a predetermined length, they are similar to horizontal bars, H and V, described above for the first embodiment in that they are perpendicular to each other and intersect at the midpoint of vertical bar V4. Furthermore, horizontal bar H4 includes spacing 78, and vertical bar V4 includes spacing 80. As described above, spacings 78 and 80 may be independently adjusted by entering a desired value on the calibration screen C using user interface 14. Therefore, the adjustment of horizontal and vertical bars H4 and V4 is identical to that described above, and will not be repeated hereafter.

Figure 18:
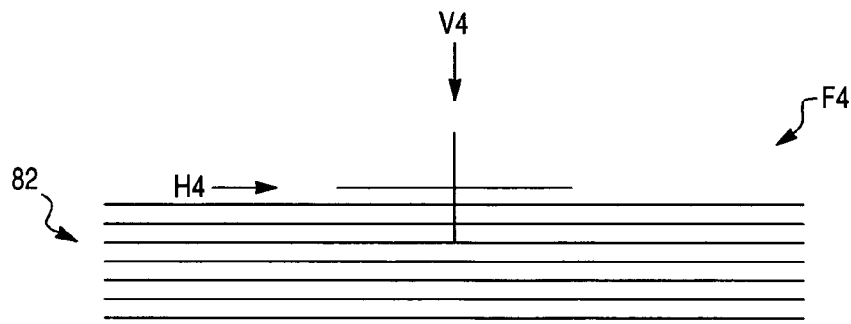
FIG. 18 is a front view of the fiducials of FIG. 17 in a second orientation.
Figure 19:
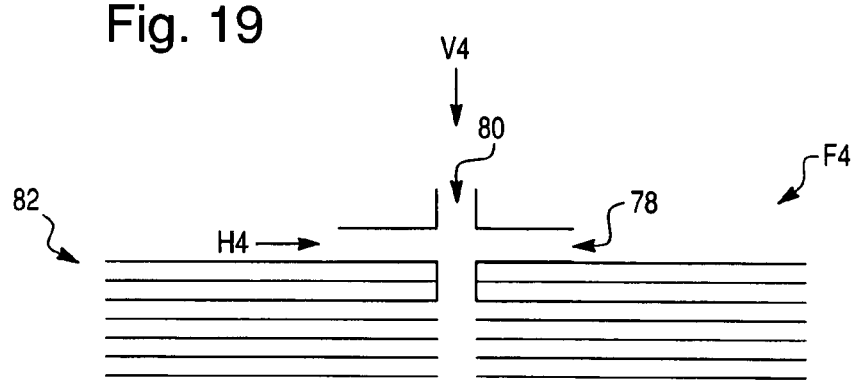
FIG. 19 is a front view of the fiducials of FIG. 17 in a third orientation.

Fiducials F4 also include a plurality of lines 82, which are parallel to horizontal bar H4, and extend from first legs 74a and 76a of L-shaped members 74 and 76, away from spacing 80, as shown in FIG. 17. Similar to lines 62 in the third embodiment, lines 82 include adjustable axis spacings 83; which are adjustable, as described above. However, lines 82 are positioned below horizontal bar H4, as shown in FIGS. 17–19. Spacings 78 and 80 may be decreased to zero, as best shown in FIG. 18. Spacings 78 and 80 may also be increased, as best shown in FIG. 19. Note that spacings 78 and 80 may also be independently adjusted, as explained above.

In a fifth embodiment, fiducials F5 are provided for aligning reference marks on round segment lenses. Similar to segment lens blank B2 described above, round segment lenses have a small round segment having a different prescription than the remaining portion of the lens. The round segment is usually located at the periphery of the lens, and is used for near vision.

Figure 20:
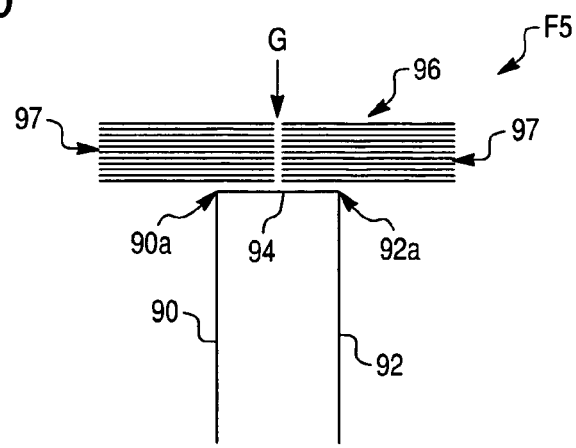
FIG. 20 is a front view of fiducials for aligning a round segment lens blank in a first orientation according to a fifth embodiment of the invention.

As best shown in FIG. 20, fiducials F5 comprise a first vertical line 90 parallel to a second vertical line 92. A horizontal line 94, perpendicular to first and second vertical lines 90 and 92, connects first and second vertical lines 90 and 92 at ends 90a and 92a of first and second vertical lines 90 and 92, respectively.

Figure 21:
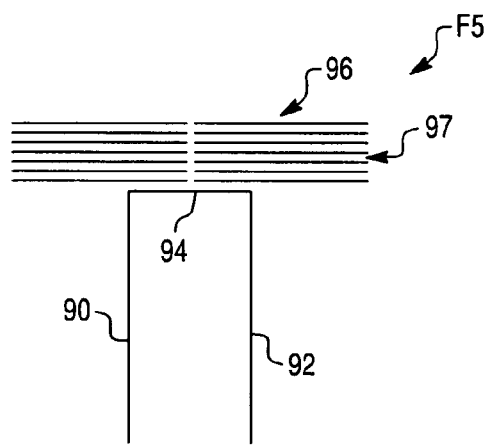
FIG. 21 is a front view of the fiducials of FIG. 20 in a second orientation.
Figure 22:
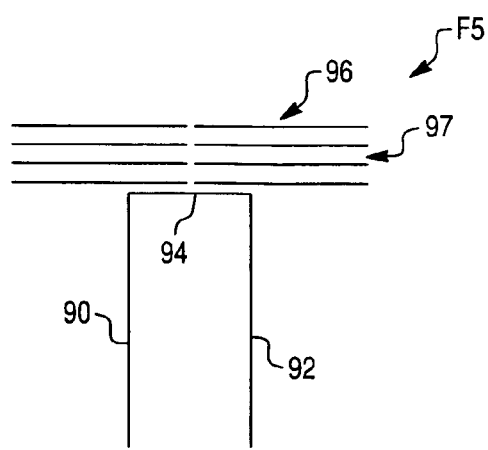
FIG. 22 is a front view of the fiducials of FIG. 20 in a third orientation.

Fiducials F5 further comprise a plurality of parallel lines 96, which are parallel to horizontal line 94, and positioned above horizontal line 94. Preferably, parallel lines 96 are each broken by a gap G at their midpoints, as shown in FIGS. 20–22. Parallel lines 96 are similar to lines 62 and 82 described above in that they include adjustable axis spacings 97. The technician may align the round segment on a blank within vertical lines 90 and 92, as well as horizontal line 94. Accurate positioning and alignment of the round segment is achieved with parallel lines 96 and adjustable axis spacings 97. The user may adjust axis spacings 97 by entering the desired value in the corresponding field 104 of calibration screen C, as described above.

Spacings 97 may be increased or decreased, as shown in FIGS. 20–22. As best shown in FIG. 21 spacings may be increased. As best shown in FIG. 20, spacings 97 may be decreased. As best shown in FIG. 22, spacings 97 have been increased further, relative to spacings shown in FIGS. 20–21.

Figure 23:
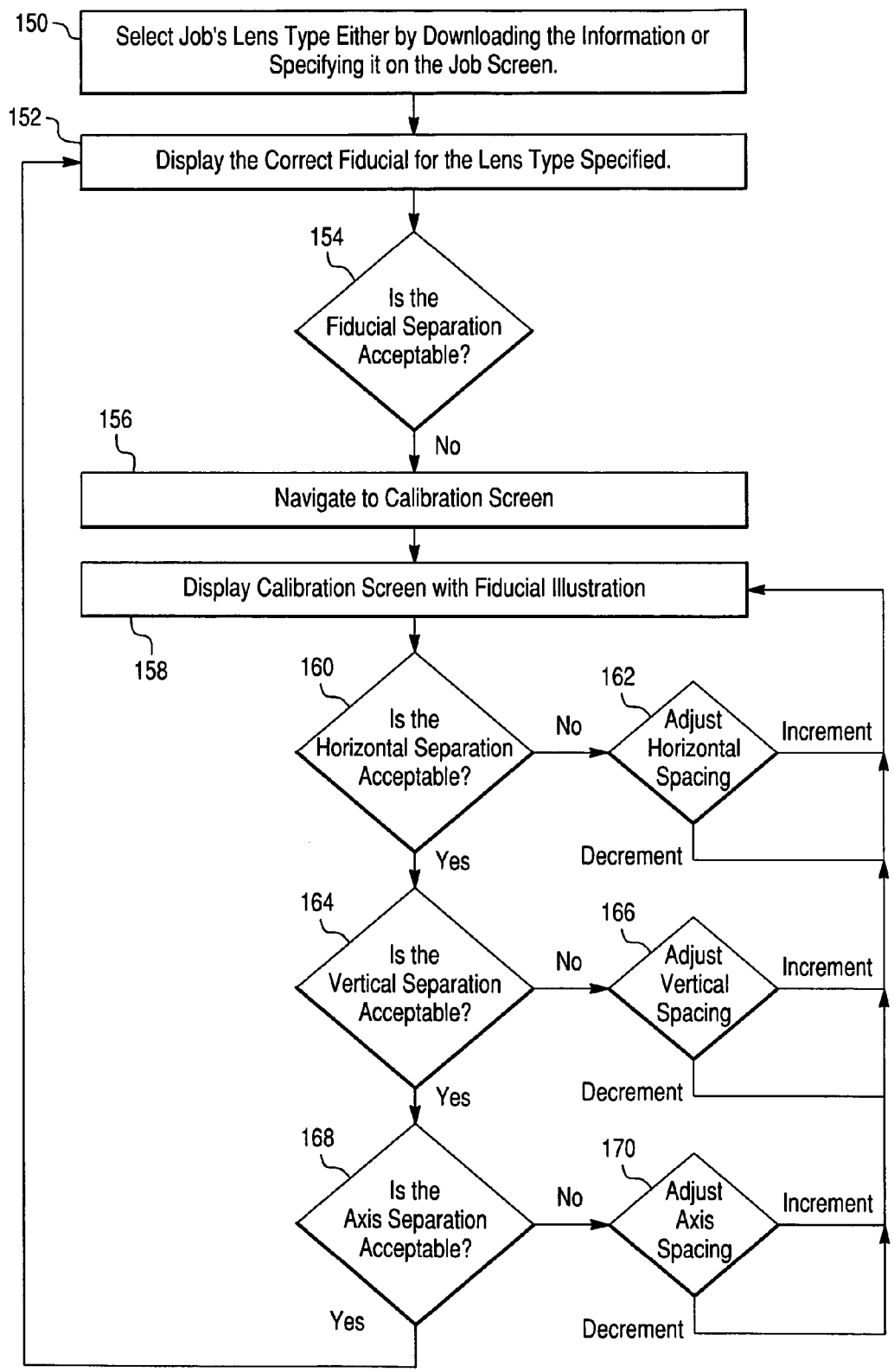
FIG. 23 is a flowchart of a method for adjusting fiducial spacings.

The disclosed invention permits variations in fiducial configurations depending on the particular lens blank and varying reference marks thereon. However, the disclosed method for adjusting the separation of the fiducial spacings is the same for all embodiments, as best shown in FIG. 23.

After a lens blank has been positioned on a retaining apparatus for aligning and blocking the lens, and the reference marks thereon displayed on a display, a user first inputs the type of lens being aligned (i.e. single vision, segment, executive segment or progressive) by downloading the selection information, or specifying the selection in a particular field on the display 10 with user interface 14, such as 'Job Type', at 150. The fiducials for the selected lens type are displayed on the display at 152. The user compares the displayed fiducials to the displayed reference marks, and determines if the fiducial spacings are acceptable at 154. If yes, precise alignment may be achieved with the displayed fiducials. If they are not acceptable, the user navigates to a calibration screen with the user interface at 156. The calibration screen is displayed with fiducial illustration thereon, and includes fields for entering values corresponding to fiducial positioning, spacing and axis adjustment at 158. The user determines if the spacing of horizontal bar H is acceptable at 160. If no, the user adjusts the horizontal spacing with the user interface by either increasing or decreasing spacing at 162. The user then determines if vertical spacing of vertical bar V is acceptable at 164. If no, the user adjusts vertical spacing with the user interface by either increasing Pr decreasing vertical spacing at 166. If necessary, the user then determines is axis spacing is acceptable at 168. If no, the user adjusts axis spacing with the user interface by either increasing or decreasing axis spacing at 170. Once horizontal and vertical spacings are acceptable, as well as axis spacing if appropriate (i.e. depending on the type of lens blank being aligned) and precisely overlay the reference marks for alignment, the fiducials for the selected lens type are again displayed on the display at 152.

We have found that the spacings 24, 26, 34, 40, 58, 60, 63, 78, 80, 83 and 97 permit accurate alignment of the lens blank because they may be adjusted based upon the reference markings of the lens blank and for the preference of the user. For example, a user might find the orientation of FIG. 4 difficult for a particular alignment marking M. Hence, the orientation of FIGS. 5 and 6 may be preferred. Alternatively, the alignment markings M may be of such a thickness as to make use of the fiducials F of FIG. 4 imprecise.

It is understood that while various preferred designs have been used to describe this invention, the invention is not limited to the illustrated and described features. Modifications, usages and/or adaptations following the general principles disclosed herein are included in the present invention, including such departures that come within known or customary practice in the art to which this invention pertains. The present invention is intended to encompass all such departures having the central features set forth above, without departing from the scope and spirit of the invention, and which fall within the scope of the appended claims.

What is claimed is:

1. A system for aligning reference marks on a lens blank, comprising:
    first fiducials displayed on a display operably associated with a computer, said first fiducials having a first adjustable spacing for aligning reference marks on a lens blank; and
    second fiducials displayed on the display, said second fiducials having first and second spaced lines defining a second spacing for aligning a segment of the lens blank.

2. The system of claim 1, wherein the second spacing may be adjusted.

3. The system of claim 1, wherein said first fiducials are a shorter length than said second fiducials.

4. The system of claim 1, wherein said first fiducials include a plurality of parallel lines spaced apart by the first adjustable spacing.

5. The system of claim 4, wherein said plurality of lines are longer in length than said second fiducials.

6. The system of claim 5, wherein said plurality of lines are positioned above said second fiducials.

7. The system of claim 5, wherein said plurality of lines are positioned below said second fiducials.

8. The system of claim 1, wherein said first fiducials comprise a first bar extending inwardly from said first line into the second spacing and a second bar extending inwardly from said second line into the second spacing.

9. The system of claim 8, wherein said first fiducials are perpendicular to said second fiducials.

10. The system of claim 9, wherein each one of said first and second bars extend from one end of said first and second lines.

11. The system of claim 10, wherein said first bar extending from said first line is symmetrical to said second bar extending from said second line.

12. A method for aligning reference marks on a lens blank, comprising the steps of:
    providing a lens blank having reference marks thereon;
    projecting the reference marks on a display;
    selecting fiducials corresponding to the lens blank;
    displaying the selected fiducials on the display; and
    orienting the lens blank so that the reference marks are aligned with the fiducials, thereby orienting and positioning the lens blank.

13. The method of claim 12, wherein the lens blank is selected from the group consisting of a single vision lens, a segment lens, a round segment lens, an executive segment lens, and a progressive lens.

14. The method of claim 12, wherein the display is operably associated with a computer.

15. The method of claim 12, comprising the step of selecting fiducials corresponding to the lens blank with a user interface.

16. The method claim 12, wherein the fiducials have first and second spacings for aligning the reference marks.

17. The method of claim 16, including the further step of adjusting the first and second spacings.

18. The method of claim 17, wherein the fiducials have adjustable axis lines for aligning the reference marks.

19. The method of claim 18, including the further step of adjusting the axis lines.

* * * * *